United States Patent
Kim

(10) Patent No.: US 8,693,058 B2
(45) Date of Patent: Apr. 8, 2014

(54) IMAGE FORMING APPARATUS AND IMAGE FORMING METHOD TO PROVIDE MULTI-BIT DATA BY COMBINING A PLURALITY OF SUCCESSIVE BINARY DATA

(75) Inventor: Kyeong-man Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 344 days.

(21) Appl. No.: 13/031,819

(22) Filed: Feb. 22, 2011

(65) Prior Publication Data
US 2012/0062958 A1  Mar. 15, 2012

(30) Foreign Application Priority Data
Sep. 14, 2010 (KR) .................. 10-2010-0089874

(51) Int. Cl.
*G06K 15/00* (2006.01)
*G06K 9/00* (2006.01)
*G09G 5/02* (2006.01)
*G03G 13/04* (2006.01)

(52) U.S. Cl.
USPC .......... 358/3.06; 358/1.9; 358/3.02; 358/534; 358/536; 382/176; 382/237; 382/252; 345/596; 345/616; 347/131; 347/188

(58) Field of Classification Search
None
See application file for complete search history.

(56) References Cited

U.S. PATENT DOCUMENTS

| | | | |
|---|---|---|---|
| 5,193,008 A | 3/1993 | Frazier et al. | |
| 5,387,985 A | 2/1995 | Loce et al. | |
| 6,217,149 B1* | 4/2001 | Takagi et al. | 347/41 |
| 7,046,863 B2* | 5/2006 | Chang et al. | 382/299 |
| 7,375,843 B2* | 5/2008 | Kaburagi | 358/1.2 |
| 2004/0051902 A1* | 3/2004 | Sasaki | 358/2.1 |
| 2012/0020570 A1* | 1/2012 | Yao et al. | 382/203 |

FOREIGN PATENT DOCUMENTS

| | | | |
|---|---|---|---|
| EP | 0878771 A2 * | 3/1998 | |
| EP | 0945823 A2 * | 8/1998 | |
| EP | 0878771 A2 | 11/1998 | |
| EP | 0945823 A2 | 9/1999 | |

OTHER PUBLICATIONS

European Office Action dated Oct. 20, 2011 issued in corresponding European Patent Application No. 11174976.8.
US 5,206,741, 04/1993, Shimura et al. (withdrawn)

* cited by examiner

*Primary Examiner* — Steven Kau
(74) *Attorney, Agent, or Firm* — Staas & Halsey LLP

(57) ABSTRACT

An image forming apparatus is provided. The image forming apparatus includes a communication interface unit which receives print data, a rendering unit which converts the received print data into a bitmap image by rendering, a binarization unit which generates binary data by carrying out halftoning with respect to the bitmap image, a data combining unit which generates multi-bit data by combining a plurality of successive binary data of the generated binary data, and a print engine which forms an image on a print paper using the generated multi-bit data.

19 Claims, 9 Drawing Sheets

US 8,693,058 B2

IMAGE FORMING APPARATUS AND IMAGE FORMING METHOD TO PROVIDE MULTI-BIT DATA BY COMBINING A PLURALITY OF SUCCESSIVE BINARY DATA

CROSS-REFERENCE TO RELATED APPLICATION

This application claims priority benefit from Korean Patent Application No. 10-2010-0089874, filed on Sep. 14, 2010, in the Korean Intellectual Property Office, the disclosure of which is incorporated herein by reference in its entirety.

BACKGROUND

1. Field

Apparatuses and methods consistent with the disclosure provided herein relate to an image forming apparatus and an image forming method thereof, and more particularly to an image forming apparatus and an image forming method thereof which provide outputs at 1200×1200 dpi resolution by forming part of combined data as half-size dots.

2. Description of the Related Art

An image forming apparatus operates to print out print data generated at a terminal, such as a computer, onto a print medium. The examples of the image forming apparatus may include a copier, a printer, a facsimile, or a multi function peripheral (MFP) which integrates therein the above-mentioned functions.

Conventionally, when received print data has higher resolution than the resolution supported by the image forming apparatus, the image forming apparatus converts print data to a lower resolution before carrying out print job.

For example, if print data at 1200×1200 dpi resolution is received at the image forming apparatus which supports 1200×600 dpi resolution, conventionally, the image forming apparatus carries out rendering and binarization with respect to the received data at 1200 dpi, converts the binarized data into data at 600 dpi at final step and carries out the print job. This means that the conventional image apparatus outputs resolution of 600×600 dpi.

Accordingly, the conventional image forming apparatus cannot support print jobs that require resolution higher than 600 dpi, such as print job related to CAD, blueprint, or fingerprint. Accordingly, an image forming method is necessary, which is capable of providing output at resolution as high as 1200 dpi in any circumstances.

SUMMARY

Exemplary embodiments overcome the above disadvantages and other disadvantages not described above. Also, the embodiments are not required to overcome the disadvantages described above, and an exemplary embodiment may not overcome any of the problems described above.

According to one embodiment, an image forming apparatus and an image forming method are provided, which provide output at 1200×1200 dpi resolution by combining binary data and forming part of the composited data as half-size dots.

According to an exemplary embodiment, an image forming apparatus may include a communication interface unit which receives print data, a rendering unit which converts the received print data into a bitmap image by rendering, a binarization unit which generates binary data by carrying out halftoning with respect to the bitmap image, a data combining unit which generates multi-bit data by combining a plurality of successive binary data of the generated binary data, and a print engine which forms an image on a print paper using the generated multi-bit data.

The received print data may be raw data with 1200×1200 dpi (dots per inch) resolution.

The rendering unit may generate bitmap data at 1200×1200 dpi resolution from the received print data.

The print engine unit may have 1200 dpi resolution in a main-scan direction and 600 dpi resolution in a sub-scan direction.

The data combining unit may combine a plurality of successive binary data in an advancing direction of the print paper.

The data combining unit may generate at least one 2-bit data from among '$00_{(2)}$', '$01_{(2)}$', '$10_{(2)}$' and '$11_{(2)}$', by combining two binary data in a vertical direction from among the binary data.

The print engine unit may form at least one of: white dot, half-size dot, and full-size dot.

The print engine unit may form the half-size dot with respect to '$01_{(2)}$' and '$10_{(2)}$' of the 2-bit data.

The dot formed by the half-size dot may have 1200 dpi pitch.

In another exemplary embodiment, an image forming method of an image forming apparatus is provided, in which the image forming method may include receiving print data, rendering to convert the received print data into a bitmap image, halftoning with respect to the bitmap image to generate binary data, data combining to generate multi-bit data by combining a plurality of successive binary data of the generated binary data, and forming an image on a print paper using the generated multi-bit data.

The received print data may be raw data with 1200×1200 dpi (dots per inch) resolution.

The rendering may include generating bitmap data at 1200×1200 dpi resolution from the received print data.

The forming an image may include using a print engine having 1200 dpi resolution in a main-scan direction and 600 dpi resolution in a sub-scan direction.

The data combining may include combining a plurality of successive binary data in an advancing direction of the print paper.

The data combining may include generating at least one 2-bit data from among '$00_{(2)}$', '$01_{(2)}$', '$10_{(2)}$' and '$11_{(2)}$', by combining two binary data in a vertical direction from among the binary data.

The forming an image may include forming at least one of: white dot, half-size dot, and full-size dot.

The forming an image may include forming the half-size dot with respect to '$01_{(2)}$' and '$10_{(2)}$' of the 2-bit data.

The dot formed by the half-size dot may have 1200 dpi pitch.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
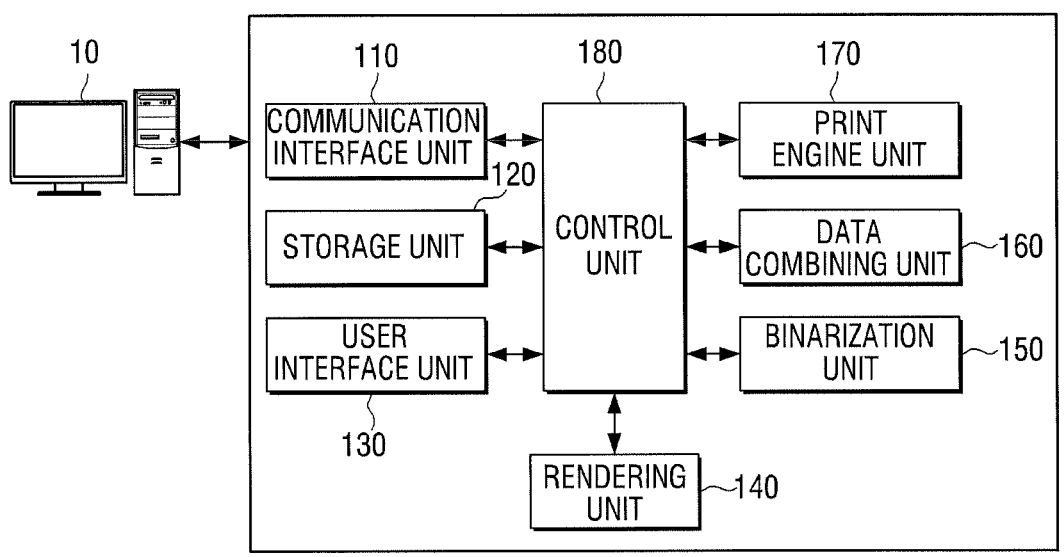
FIG. 1 is a block diagram of an image forming apparatus according to an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding embodiments. Accordingly, it is apparent that the exemplary embodiments can be carried out without those specifically defined matters. Also, well-known functions or constructions are not described in detail since they would obscure the description with unnecessary detail.

FIG. 1 is a block diagram of an image forming apparatus according to an exemplary embodiment.

Referring to FIG. 1, an image forming apparatus 100 includes a communication interface unit 110, a storage unit 120, a user interface unit 130, a rendering unit 140, a binarization unit 150, a data combining unit 160, a print engine unit 170, and a control unit 180.

The communication interface unit 110 is provided to connect the image forming apparatus 100 to a print control terminal 10, via not only local area network (LAN) and Internet, but also universal serial bus (USB) port. The communication interface unit 110 may receive print data from the print control terminal 10. The received print data may have 1200×1200 dpi resolution, or the data may be in a form of vector data.

The communication interface unit 110 may receive a resolution option from the print control terminal 10. To be specific, a user may set a print resolution with a print driver which is installed on the print control terminal 10. Accordingly, if the user sets 1200 dpi resolution output with the print driver, the print control terminal 10 may transfer to the image forming apparatus 100 "1200 dpi resolution option", thus indicating that the output has to be carried out at 1200 dpi resolution.

In actual implementation, the image forming apparatus 100 may be set to carry out 1200 dpi resolution print job only upon receipt of "1200 dpi resolution option" from the print control terminal 10. However, the image forming apparatus 100 may also carry out 1200 dpi resolution print job without receiving "1200 dpi resolution option", if the received print data has a 1200×1200 dpi resolution.

The storage unit 120 stores therein print data. To be specific, the storage unit 120 stores therein the print data received via the communication interface unit 110. The storage unit 120 may additionally store therein data processed at the rendering unit 140, the binarization unit 150 and the data combining unit 160 (e.g., bitmap data, binary data, multi-bit data, or the like). Meanwhile, the storage unit 120 may be implemented as an internal storage medium of the image forming apparatus, or an external storage medium, such as a removable disk including USB memory, or Web server via network. In one embodiment, only one storage unit 120 is illustrated and explained. However, this is written only for illustrate purpose, and accordingly, the storage unit 120 may be divided into a memory for data storage, memory for command processing, or the like.

The user interface unit 130 includes a plurality of function keys with which a user sets or selects a variety of functions supported by the image forming apparatus, and may display various information provided by the image forming apparatus 100. The user interface unit 130 may be implemented as a combination of a monitor and a mouse, or as a device such as touchpad which is capable of both inputting and outputting.

The rendering unit 140 converts received print data into bitmap image by rendering. To be specific, the rendering unit 140 may generate a bitmap image by carrying out rendering with respect to the print data received from the print control terminal 10. Herein, the rendering unit 140 may convert raw data at a resolution of 1200×1200 dpi into bitmap image with a 1200×1200 dpi resolution, and also convert raw data or vector data at resolution lower than 1200×1200 dpi into bitmap image at a 1200×1200 dpi resolution. The generated bitmap image may be stored at the storage unit 120 temporarily.

The binarization unit 150 generates binary data by carrying out halftoning with respect to the bitmap image. To be specific, the binarization unit 150 carries out halftoning including, for example, screening or dithering with respect to the bitmap image rendered at the rendering unit 140, to thus generate binary data (1200×1200×1 bit). The generated binary data may be stored temporarily at the storage unit 120. To be specific, the storage unit 120 may store the generated binary data by writing the generated binary data over the previously stored bitmap image, or alternatively, store the generated binary data at a separate location.

The data combining unit 160 combines successive binary data of the generated binary data to generate multi-bit data. To be specific, the data combining unit 160 may generate at least one 2-bit data from among '$00_{(2)}$', '$01_{(2)}$', '$10_{(2)}$' and '$11_{(2)}$' by combining two successive binary data in the advancing direction (i.e., sub-scan direction) of the print paper. By way of example, if data '$0_{(2)}$', '$0_{(2)}$', '$0_{(2)}$', '$1_{(2)}$' successively exist in the sub-scan direction, the data combining unit 160 may generate two 2-bit data of '$00_{(2)}$', '$01_{(2)}$'. The operation of the data combining unit 160 will be explained in greater detail below with reference to FIG. 3.

The storage unit 120 may store the multi-bit data generated at the data combining unit 160. To be specific, the storage unit 120 may store the generated multi-bit data, by writing the generated multi-bit data over the address of the previously-stored binary data.

The print engine unit 170 forms an image using the generated multi-bit data. To be specific, the print engine unit 170 may use a print engine with the resolution of 1200 dpi in main-scan direction and 600 dpi in sub-scan direction.

The print engine unit 170 generates a plurality of dots to correspond to the multi-bit data transferred from the data combining unit 160, and attach toner to the generated dots to thus form an image. Herein, the print engine unit 170 may generate dots, such as white dots, half-size dots, or full-size dots.

To be specific, the print engine unit 170 may form a white dot if the multi-bit data transferred from the data combining unit 160 is '$00_{(2)}$', forms a half-size dot if the transferred multi-bit data is '$01_{(2)}$' and '$10_{(2)}$', and forms a full-size dot if the transferred multi-bit data is '$11_{(2)}$'. The half-size dot may have 1200 dpi pitch.

As explained above, the print engine unit 170 according to an exemplary embodiment receives and processes data at 600 dpi level, but applies resolution enhancement technology (RET) to form three different forms of dots depending on the multi-bit information. As a result, the print engine unit 170 is capable of outputting at the output resolution of 1200 dpi. The RET operation of the print engine unit 170 will be explained in greater detail below with reference to FIGS. 3 to 8.

The control unit 180 controls the respective components of the image forming apparatus 100. To be specific, the control unit 180 may control the storage unit 120 to temporarily store print data, if the print data is received from the print control terminal 10.

The control unit 180 may also control the rendering unit 140, the binarization unit 150, the data combining unit 160 and the print engine unit 170 to print out the print data stored at the storage unit 120 at the resolution of 1200 dpi.

As explained above, the image forming apparatus 100 according to an exemplary embodiment converts only the form of the binary data at 1200×1200 dpi resolution without affecting the data itself, and transfers the converted data to the print engine. Then as the print engine forms half-size dots at 1200 dpi pitch with respect to '$01_{(2)}$' and '$10_{(2)}$' of the transferred multi-bit data, the print job is carried out at the resolution of 1200×1200 dpi as desired by the user.

Figure 2:
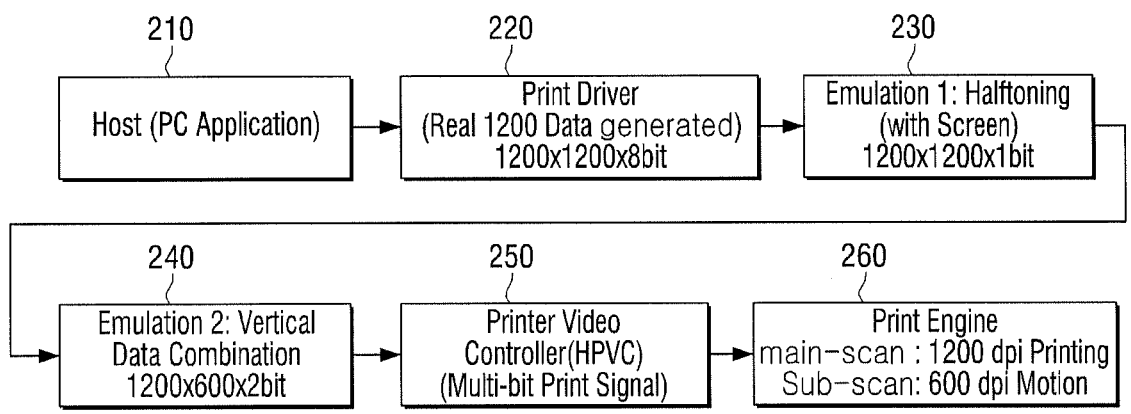
FIGS. 2 and 3 are views provided to explain changes in print data according to an exemplary embodiment.
Figure 3:
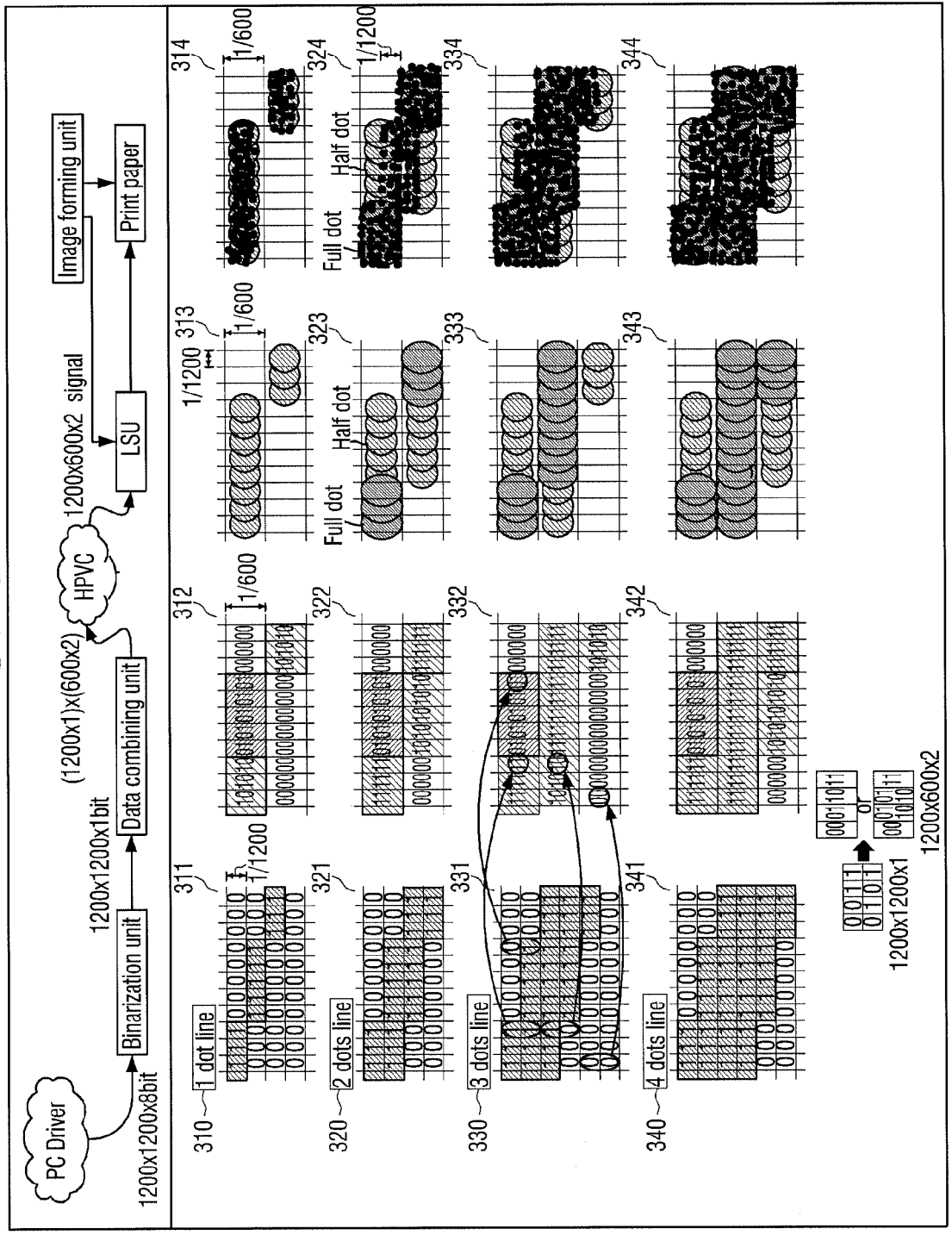

FIGS. 2 and 3 are views provided to explain changes in the print data according to an exemplary embodiment.

First, at operation 210, the user may select or write a file that he intends to print out using the print control terminal 10. At operation 220, if the 1200 dpi resolution option is set for the file selected by the user, the print driver of the print control terminal 10 may generate raw data with 1200×1200×8 bit resolution. The generated print data is transferred to the image forming apparatus 100. In the example explained above with reference to FIG. 2, the print data is transferred from the print control terminal 10 to the image forming apparatus 100 via the print driver. However, this was written only for illustrate purpose, and accordingly, other examples are also possible. For example, the file itself may be directly transferred to the image forming apparatus 100 by a direct-print method.

When the print data is received, the image forming apparatus 100 may generate a bitmap image of 1200×1200×8 bit by carrying out rendering of the received print data. At operation 230, the image forming apparatus 100 may then convert the bitmap image (1200×1200×8 bit) into binary data by carrying out halftoning. Herein, the conventional way of halftoning which is generally used in color laser printers or black and white laser printers may be implemented.

In one embodiment, the generated binary data 1200×1200×1 bit is shown at locations 311, 321, 331, 341 of FIG. 3, in which '$1_{(2)}$' is where a dot is marked, '$0_{(2)}$' is where a dot is not marked. Referring to FIG. 3, the binary data generated as a result of halftoning have 1200 dpi pitch in both main-scan and sub-scan directions.

Next, at operation 240, multi-bit data (1200×600×2 bit) may be generated by combining two successive bits in sub-scan direction of the generated binary data (1200×1200×1 bit). The "sub-scan direction" herein refers to the direction of print paper, and the "main-scan direction" refers to the operation direction of LSU which is perpendicular to the direction of the print paper.

In one embodiment, the examples of the generated multi-bit data (1200×600×2 bit) are shown at locations 312, 322, 332, 342 of FIG. 3. Referring to FIG. 3, as a result of data combination, each block has 2-bit data of '$00_{(2)}$', '$01_{(2)}$', '$10_{(2)}$' and '$11_{(2)}$'. Each of the multi-bit data has 1200 dpi pitch in the main-scan direction and has 600 dpi pitch in the sub-scan direction. Comparing the binary data with the multi-bit data reveals that change occurs only in the form of the data, but not in the data amount.

Next, at operation 250, the generated multi-bit data is transferred to the print engine, and the print engine generates dots according to the transferred multi-bit data. To be specific, the print engine unit may form white dots with respect to the transferred multi-bit data '$00_{(2)}$', full-size dots with respect to '$11_{(2)}$', and same half-size dots with respect to '$01_{(2)}$' and '$10_{(2)}$'.

In one embodiment, the examples of the generated dots are shown at locations 313, 323, 333, 343 of FIG. 3. Referring to FIG. 3, white dots are formed with respect to '$00_{(2)}$' of the multi-bit data, half-size dots are formed with respect to '$01_{(2)}$', '$10_{(2)}$', and full-size dots are formed with respect to '$11_{(2)}$'. The "half-size dot" herein refers to a dot formed by an electronic/electric signal smaller than a full-size dot signal.

At operation 260, toner may be attached to the formed dots to thus form an image on the print paper. Since the generated dot signal is not a digital signal but an analog signal at the print engine, the signal has the sinusoidal form as illustrated in FIGS. 4 to 8. Due to such physical phenomenon, the toner images coagulate as illustrated at locations 314, 324, 334, 344 of FIG. 3. That is, according to the property of a laser signal, the normalization curves overlap with each other, and as a result, physical output characteristic of toner coagulation appears between adjacent locations when the toner is attached onto the paper.

Considering the above characteristic, data is processed to have resolution of 600 dpi in the sub-scan direction (i.e., the print paper is moved at 600 dpi pitch (40 μm)), but the output has the lines of 1200 dpi line pitch on the print paper due to multi-bit print signal and also the above-mentioned physical characteristics.

Figure 4:
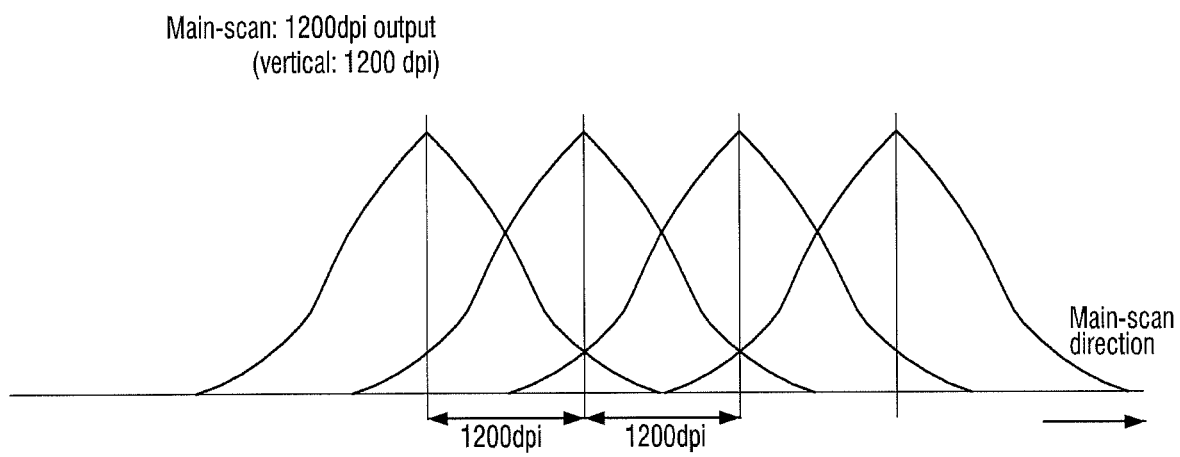
FIG. 4 is a view illustrating property of a laser signal in a main-scan direction.

FIG. 4 is a view illustrating the characteristics of a laser signal in the main-scan direction.

Referring to FIG. 4, dots are formed at 1200 dpi pitch in the main-scan direction, with each dot being in sinusoidal form. Although the illustrated example shows each dot as full-size dots, white dot or half-size dot may also be formed.

FIGS. 5 to 8 illustrate the characteristics of a laser signal in the sub-scan direction.

Figure 5:
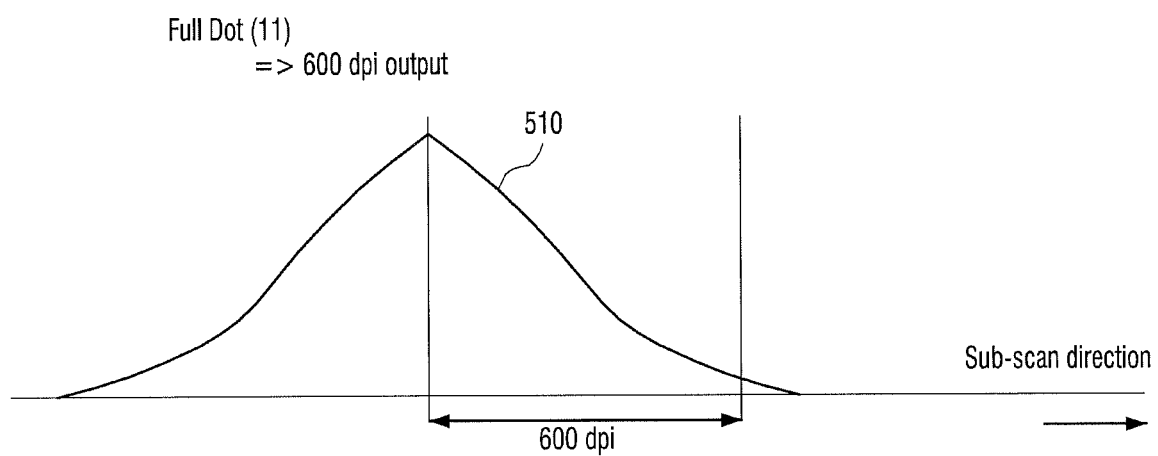
FIGS. 5 to 8 are views illustrating property of a laser signal in a sub-scan direction.
Figure 6:
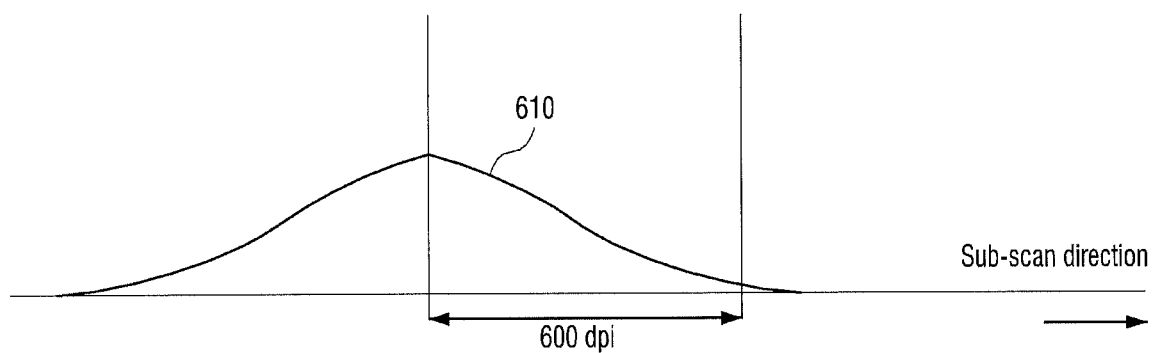

Referring first to FIGS. 5 and 6, dots are formed at 600 dpi pitch in the sub-scan direction. To be specific, FIG. 5 illustrates full-size dots 510, and FIG. 6 illustrates half-size dots 610. Comparing FIGS. 5 and 6 reveals that the half-size dot has a relatively smaller electric signal than full-size dot.

Figure 7:
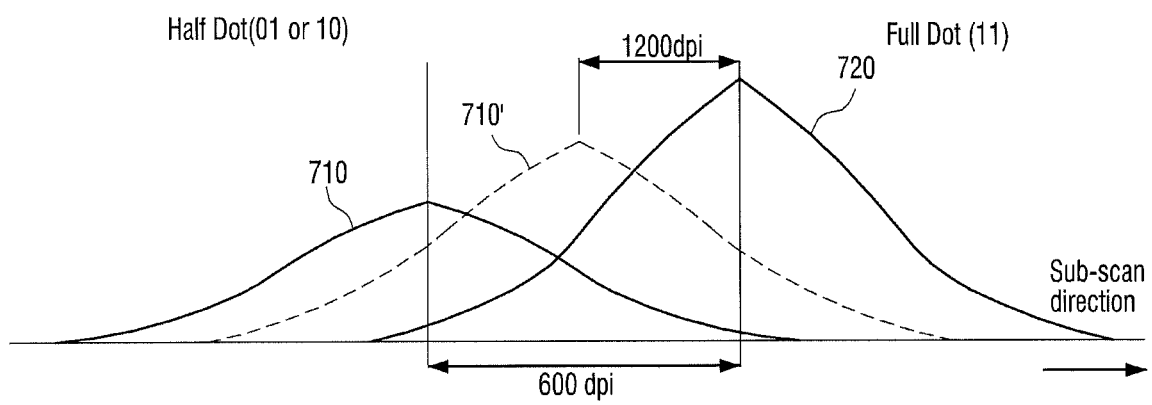
Figure 8:
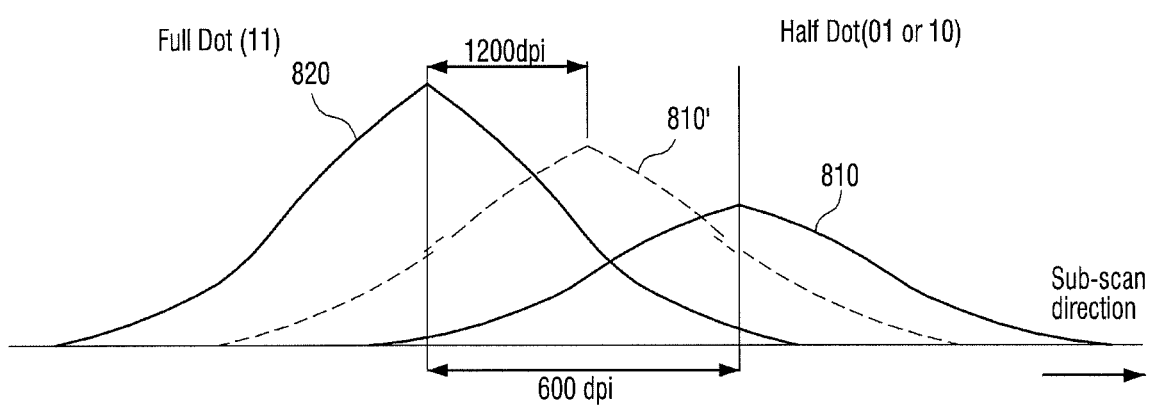

Referring to FIGS. 7 and 8, there are half-size dots 710, 810 and full-size dots 720, 820 successively in the sub-scan direction. If the half-size dots 710, 810 and the full-size dots 720, 820 are formed successively as explained above, due to higher electric signal of the full-size dots 720, 810, toner intended for the half-size dots 710, 810 is attracted toward the full-size dots 720, 820 and as a result, attached to locations 710', 810' between the half-size dots 710, 810 and the full-size dots 720, 820. However, the toner lines 710', 810' also have 1200 dpi pitch in the sub-scan direction.

Figure 9:
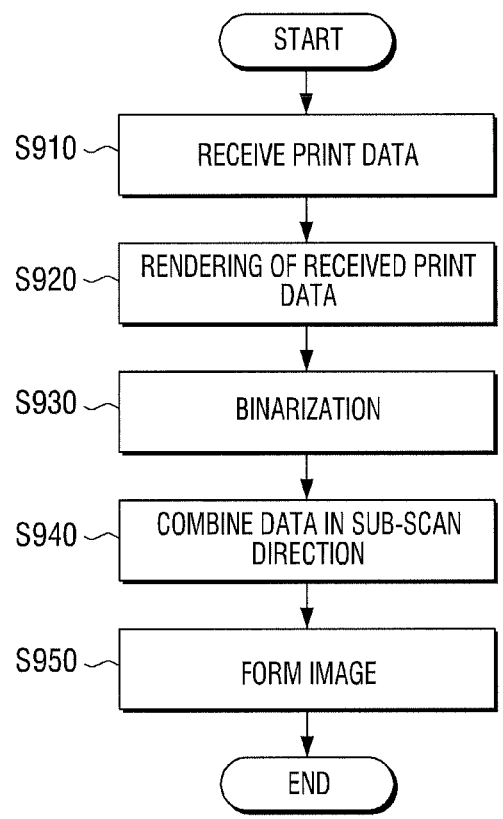
FIG. 9 is a flowchart provided to explain an image forming method according to an exemplary embodiment.

FIG. 9 illustrates an image forming method according to an exemplary embodiment.

Referring to FIG. 9, first, at operation 910, print data is received. To be specific, the print data or vector print data with the resolution of 1200×1200 dpi may be received from the print control terminal 10.

At operation 920, the received print data is converted into a bitmap image by rendering. To be specific, the print control terminal 10 may generate a bitmap image by carrying out rendering of the received print data. Herein, the rendering may convert not only raw data at resolution of 1200×1200 dpi into a bitmap image with 1200×1200 dpi resolution, but also convert raw data or vector data at resolution lower than 1200×1200 dpi into bitmap image at 1200×1200 dpi resolution. The generated bitmap image may be stored temporarily.

At operation 930, halftoning is carried out with respect to the bitmap image so that binary data is generated. To be specific, the halftoning such as screening or dithering may be carried out with respect to the bitmap image rendered at the previous step, to thus generate binary data.

At operation 940, a plurality of successive binary data of the generated binary data is combined to generate multi-bit data. To be specific, at least one 2-bit data may be generated from among '$00_{(2)}$', '$01_{(2)}$', '$10_{(2)}$' and '$11_{(2)}$' by combining two successive binary data in the advancing direction (i.e., sub-scan direction) of the print paper. By way of example, if data '$0_{(2)}$', '$0_{(2)}$', '$0_{(2)}$', '$1_{(2)}$' successively exist in the sub-scan direction, two 2-bit data of '$00_{(2)}$', '$01_{(2)}$' may be generated. The generated data may be stored temporarily. To be specific, the multi-bit data may be stored in a manner of writing over the binary data which is generated in the previous step.

At operation 950, an image may be formed using the generated multi-bit data. To be specific, using a print engine with the resolution of 1200 dpi in main-scan direction and 600 dpi in sub-scan direction, a white dot may be formed if the multi-bit data is '$00_{(2)}$', a half-size dot is formed if the multi-bit data is '$01_{(2)}$' and '$10_{(2)}$', and a full-size dot is formed if the multi-bit data is '$11_{(2)}$'. The half-size dot may have 1200 dpi pitch. An image may then be formed as toner is attached to the plurality of dots as formed, and then transferred onto a print paper.

As explained above, the image forming method according to an exemplary embodiment converts only the form of the binary data at 1200×1200 dpi resolution into multi-bit data form, without affecting the binary data itself, and transfers the converted data to the print engine. Then as the print engine forms half-size dots at 1200 dpi pitch with respect to '$01_{(2)}$' and '$10_{(2)}$' of the transferred multi-bit data, print job is carried out at the resolution of 1200×1200 dpi as desired by the user. The image forming method of FIG. 9 may be implemented in an image forming apparatus as the one with the construction explained above with reference to FIG. 1, or image forming apparatuses with other constructions. It is also understood that a resolution of 1200×1200 dpi is only an example, but can be also higher resolution than 1200×1200 dpi.

The foregoing exemplary embodiments and advantages are merely exemplary and are not to be construed as limiting the embodiments. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image forming apparatus:
 a communication interface unit which receives print data;
 a rendering unit which converts the received print data into a bitmap image by rendering;
 a binarization unit which generates binary data by carrying out halftoning with respect to the bitmap image;
 a data combining unit which generates multi-bit data by combining a plurality of successive binary data of the generated binary data; and
 a print engine which forms a plurality of dots to correspond to the generated multi-bit data on a print paper and capable of independently printing each, of a white dot, a half-size dot and full-size dot so that adjacent dots overlap one another.

2. The image forming apparatus of claim 1, wherein the received print data comprise raw data with 1200×1200 dpi (dots per inch) resolution.

3. The image forming apparatus of claim 1, wherein the rendering unit generates bitmap data at 1200×1200 dpi resolution from the received print data.

4. The image forming apparatus of claim 1, wherein the print engine unit has 1200 dpi resolution in a main-scan direction and 600 dpi resolution in a sub-scan direction.

5. The image forming apparatus of claim 1, wherein the data combining unit combines a plurality of successive binary data in a sub-scan direction of the print paper.

6. The image forming apparatus of claim 1, wherein the data combining unit generates at least one 2-bit data from among '$00_{(2)}$', '$01_{(2)}$', '$10_{(2)}$' and '$11_{(2)}$', by combining two binary data in a vertical direction from among the binary data.

7. The image forming apparatus of claim 1, wherein the print engine unit forms the half-size dot with respect to '$01_{(2)}$' and '$10_{(2)}$' of the 2-bit data.

8. The image forming apparatus of claim 1, wherein the dot formed by the half-size dot has 1200 dpi pitch.

9. The image forming apparatus of claim 1, the image forming apparatus, further comprising:
 a storage unit to store the print data.

10. An image forming method of an image forming apparatus, the image forming method comprising:
 receiving print data;
 rendering to convert the received print data into a bitmap image;
 halftoning with respect to the bitmap image to generate binary data;
 data combining to generate multi-bit data by combining a plurality of successive binary data of the generated binary data; and
 forming a plurality of dots to correspond to the generated multi-bit data on a print paper and capable of independently printing each of a white dot, a half-size dot and a full-size dot so that adjacent dots overlap one another.

11. The image forming method of claim 10, wherein the received print data comprise raw data with 1200×1200 dpi (dots per inch) resolution.

12. The image forming method of claim 10, wherein the rendering comprises generating bitmap data at 1200×1200 dpi resolution from the received print data.

13. The image forming method of claim 10, wherein the forming an image comprises using a print engine having 1200 dpi resolution in a main-scan direction and 600 dpi resolution in a sub-scan direction.

14. The image forming method of claim 10, wherein the data combining comprises combining a plurality of successive binary data in an advancing direction of the print paper.

15. The image forming method of claim 10, wherein the data combining comprises generating at least one 2-bit data from among '$00_{(2)}$', '$01_{(2)}$', '$10_{(2)}$' and '$11_{(2)}$', by combining two binary data in a vertical direction from among the binary data.

16. The image forming method of claim 10, wherein the forming an image comprises forming the half-size dot with respect to '$01_{(2)}$' and '$10_2$)' of the 2-bit data.

17. The image forming method of claim 10, wherein the dot formed by the half-size dot has 1200 dpi pitch.

18. An image forming method of an image forming apparatus having an m×½n dpi (dots per inch) print engine unit the image forming method, comprising:
 receiving printing data having m×n dpi;
 converting the received printing data into reduced size dot in a sub-scanning direction resolution to print out m×n dpi resolution; and
 printing the converted printing data out with m×n dpi resolution using the m×½ n dpi print engine unit and independently printing out each of a white dot, a half-size dot and a full-size dot so that adjacent dots overlap one another, wherein the m is a main-scanning direction resolution and the n is the sub-scanning direction resolution.

19. The image forming method of claim 18, wherein m=n and m=1200.

\* \* \* \* \*

UNITED STATES PATENT AND TRADEMARK OFFICE
CERTIFICATE OF CORRECTION

PATENT NO. : 8,693,058 B2  Page 1 of 1
APPLICATION NO. : 13/031819
DATED : April 8, 2014
INVENTOR(S) : Kim It is certified that error appears in the above-identified patent and that said Letters Patent is hereby corrected as shown below:

In the Claims

Column 8, Line 56, in Claim 16, delete "'$10_2$)'" and insert -- '$10_{(2)}$' --, therefor.

Signed and Sealed this
Twenty-second Day of July, 2014

Michelle K. Lee
*Deputy Director of the United States Patent and Trademark Office*